US012745798B2

(12) United States Patent
Qi et al.

(10) Patent No.: US 12,745,798 B2
(45) Date of Patent: Sep. 29, 2026

(54) HEATING DEVICE

(71) Applicant: SHENZHEN FIRST UNION TECHNOLOGY CO., LTD., Shenzhen (CN)

(72) Inventors: Zuqiang Qi, Shenzhen (CN); Jian Wu, Shenzhen (CN); Jiamao Luo, Shenzhen (CN); Baoling Lei, Shenzhen (CN); Zhongli Xu, Shenzhen (CN); Yonghai Li, Shenzhen (CN)

(73) Assignee: SHENZHEN FIRST UNION TECHNOLOGY CO., LTD., Shenzhen (CN)

( * ) Notice: Subject to any disclaimer, the term of this patent is extended or adjusted under 35 U.S.C. 154(b) by 1108 days.

(21) Appl. No.: 17/758,886

(22) PCT Filed: Jan. 15, 2021

(86) PCT No.: PCT/CN2021/072246

§ 371 (c)(1),
(2) Date: Dec. 20, 2022

(87) PCT Pub. No.: WO2021/143874

PCT Pub. Date: Jul. 22, 2021

(65) Prior Publication Data

US 2023/0217998 A1 Jul. 13, 2023

(30) Foreign Application Priority Data

Jan. 17, 2020 (CN) ........................ 202010054549.4

(51) Int. Cl.
*A24F 40/46* (2020.01)
*H05B 3/46* (2006.01)

(52) U.S. Cl.
CPC ............... *A24F 40/46* (2020.01); *H05B 3/46* (2013.01); *H05B 2203/013* (2013.01)

(58) Field of Classification Search
CPC ... H05B 3/12; H05B 3/44; H05B 3/46; H05B 3/48; H05B 2203/013; H05B 2203/016;
(Continued)

(56) References Cited

U.S. PATENT DOCUMENTS

2014/0314396 A1* 10/2014 Hsu ......................... F24H 3/002
392/376

FOREIGN PATENT DOCUMENTS

CN 102329086 A * 1/2012
CN 206520208 U 9/2017
(Continued)

*Primary Examiner* — Hung D Nguyen
(74) *Attorney, Agent, or Firm* — PROI Intellectual Property US

(57) ABSTRACT

A heating device comprises a heating body which comprises: a base body provided with a chamber for receiving at least part of the aerosol generating substrate product; an infrared electrothermal coating, which is formed on the outer surface of the base body, used for receiving a power supply to generate heat and transfers the heat to the aerosol generating substrate product received in the chamber at least in an infrared radiation manner, so as to volatilize at least one component in the aerosol generating substrate product to form an aerosol which can be vaped; an electrode coating part of the outer surface of the infrared electrothermal coating and used for supplying the electric power of the power supply to the infrared electrothermal coating; and an infrared radiation coating at least partially covering the infrared electrothermal coating, wherein the infrared radiation coating can radiate infrared rays after a temperature rise.

10 Claims, 3 Drawing Sheets

(58) Field of Classification Search
CPC ........ H05B 2203/022; H05B 2203/021; H05B 2203/032; A24F 40/00; A24F 40/10; A24F 40/20; A24F 40/40; A24F 40/42; A24F 40/46
See application file for complete search history.

(56) References Cited

FOREIGN PATENT DOCUMENTS

| | | | | | |
|---|---|---|---|---|---|
| CN | 107660006 | A | | 2/2018 | |
| CN | 207125321 | U | | 3/2018 | |
| CN | 108338417 | A | | 7/2018 | |
| CN | 109077358 | A | | 12/2018 | |
| CN | 109157130 | A | | 1/2019 | |
| CN | 109380766 | A | | 2/2019 | |
| CN | 109770433 | A | | 5/2019 | |
| CN | 109832674 | A | | 6/2019 | |
| CN | 109846093 | A | * | 6/2019 | ............. A24F 40/20 |
| CN | 110384264 | A | | 10/2019 | |
| CN | 209573235 | U | | 11/2019 | |
| WO | 2017017230 | A1 | | 2/2017 | |

* cited by examiner

HEATING DEVICE

This application claims priority to Chinese Patent Application No. 202010054549.4, entitled “Heating device” and submitted to China National Intellectual Property Administration on Jan. 17, 2020, the entire content of which is incorporated herein by reference.

TECHNICAL FIELD

The present disclosure relates to the technical field of smoking sets, and in particular to a heating device, which is configured for heating an aerosol generating substrate to volatilize at least one component therein to form an aerosol for a user to inhale.

BACKGROUND

Traditional smoking products such as cigarettes and cigars are burning tobaccos to produce tobacco smoke for people to inhale during usage. During the process of burning, the smoking products, while volatilizing effective ingredients such as nicotine, will generate toxic and carcinogenic substances such as tar and carbon monoxide due to incomplete combustion. These substances have been proved to be the main cause of health problems of smokers. People have attempted to produce products that release compounds such as nicotine without burning to substitute those tobacco products burning tobaccos so as to reduce the hazard of smoking. An example of this kind of products is a so called heating nonburning product, which heats rather than burns a smoking product to release effective compounds such as nicotine. Due to non-combustion, those toxic and carcinogenic substances such as tar and carbon in the smoke will be greatly reduced.

Infrared heating tube for low-temperature smoke is a novel heating component for low-temperature smoke. A surface of the heating tube is plated with an ATO infrared heating film through methods such as chemical vapor deposition, and the infrared heating film generates heat through electrification and then heats the smoking product in the tube by converting the heat into the form of infrared radiation. Such a heating mode to heat a smoke product, compared to a conventional heat conduction heating mode, achieves better mouthfeel and smoke volume. The reason is that infrared heating has better uniformity of temperature field and certain penetrability, which enables materials such as tobacco in the smoking product to be almost heated by infrared radiation together.

Smoking sets employing the above structure have the following problems. The infrared electrothermal coating radiates infrared rays at the periphery of the smoking product, however, when radiating infrared rays towards the smoking product inside the base body, the infrared coating is also radiating heat towards the periphery, in addition, due to the existence of the base body, a reflecting interface exists at the interface between the infrared electrothermal coating and the base body, causing part of the infrared rays to be reflected, thus reducing the utilization of power supply of the infrared electrothermal coating, impacting the preheating speed and smoke generation peed of the smoke product, and reducing user experience.

SUMMARY

In order to solve the problem of low efficiency of utilization of power supply in existing technologies and to improve user experience, the present disclosure provides a heating device.

The present disclosure provides a heating device, configured for heating an aerosol generating substrate product and volatilizing at least one component therein to form an aerosol, including a heating body, wherein the heating body includes:

a base body, which is provided with a chamber for receiving at least part of the aerosol generating substrate product;

an infrared electrothermal coating, which is formed on an outer surface of the base body and is configured for receiving an electric power of a power supply to generate heat and transferring the heat to the aerosol generating substrate product received in the chamber at least in an infrared radiation manner, so as to volatilize at least one component in the aerosol generating substrate product to form an aerosol which can be inhaled;

an electrode coating, which is coated on part of the outer surface of the infrared electrothermal coating and configured for supplying the electric power of the power supply to the infrared electrothermal coating; and an infrared radiation coating, which at least partially covers the infrared electrothermal coating, the infrared radiation coating being capable of radiating infrared rays after a temperature rise.

Further, the infrared radiation coating has a greater square resistance than the infrared electrothermal coating.

Further, the infrared radiation coating has a smaller thermal conductivity than the infrared electrothermal coating.

Further, the electrode coating includes an electrode portion and an electrode connection portion, and the infrared radiation coating does not cover the electrode connection portion.

Further, the base body is of a hollow tubular structure, the chamber is formed inside the base body, and the electrode connection portions configured for connecting to a positive electrode and a negative electrode of the power supply are disposed near end parts of two ends of the base body respectively.

Further, the base body is of a hollow tubular structure, the chamber is formed inside the base body, and the electrode connection portions configured for connecting to a positive electrode and a negative electrode of the power supply are both disposed near an end part of one end of the base body.

Further, an outer surface of the base body is a rough surface.

The outer surface of the base body has a greater roughness than an inner surface of the chamber.

Further, the outer surface of the base body forms the rough surface by machining.

Further, the outer surface of the base body forms the rough surface by chemical etching.

Further, the outer surface of the base body forms the rough surface by laser cauterization.

According to the present disclosure, an infrared radiation coating is added on the peripheral side of the infrared electrothermal coating structure of the heating body, such that the escaping heat and infrared rays are absorbed by the infrared radiation coating and then the infrared radiation coating reradiates infrared rays towards the inside of the chamber, thus reducing energy dissipation and increasing energy utilization.

Through the roughening process of the reflecting surface, the reflectivity of the surface may be reduced, such that more of the infrared rays are transmitted and absorbed by the base body so as to increase the heating efficiency of the infrared heating body. Considering this point, the present disclosure prepares an unsmooth surface at the outer surface of the base body, that is, at an interface between the infrared electrothermal coating and the base body, so that the reflection of the infrared rays emitted by the infrared electrothermal coating is reduced at the interface, and the objective of improving the heating efficiency can be achieved.

BRIEF DESCRIPTION OF THE DRAWINGS

One or more embodiments are illustrated through the image(s) in corresponding drawing(s). These illustrations do not form restrictions to the embodiments. Elements in the drawings with a same reference number are expressed as similar elements, and the images in the drawings do not form proportional restrictions unless otherwise stated.

DETAILED DESCRIPTION

The present disclosure will become better understood from a more detailed description of the present disclosure below taken in conjunction with drawings and particular embodiments. It is to be noted that when an element is described as "fixed to" another element, it may be directly on the another element, or there might be one or more intermediate elements between them. When one element is described as "connected to" another element, it may be directly connected to the another element, or there might be one or more intermediate elements between them. Terms such as "upper", "lower", "left", "right", "inner", "outer", etc. used in the description and similar expressions are merely for the purpose of illustration.

Unless otherwise defined, all technical and scientific terms used in this description have the same meaning as those normally understood by the skill in the technical field of the present disclosure. The terms used in this description of the present disclosure are just for the purpose of describing particular embodiments, rather than limiting the present disclosure. Terms "and/or" used in the present disclosure include any and all combinations of one or more listed items.

The present disclosure is described below in detail in conjunction with drawings. What is described is merely as an aid to understanding of the present disclosure, rather than limiting the present disclosure to the described coverage.

Figure 1:
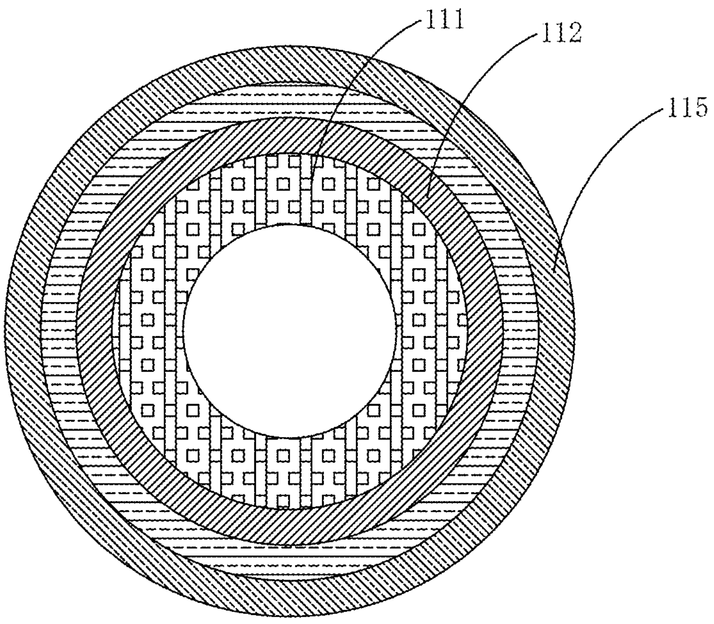
FIG. 1 is a structural diagram of an infrared heating body according to one embodiment of the present disclosure.
Figure 2:
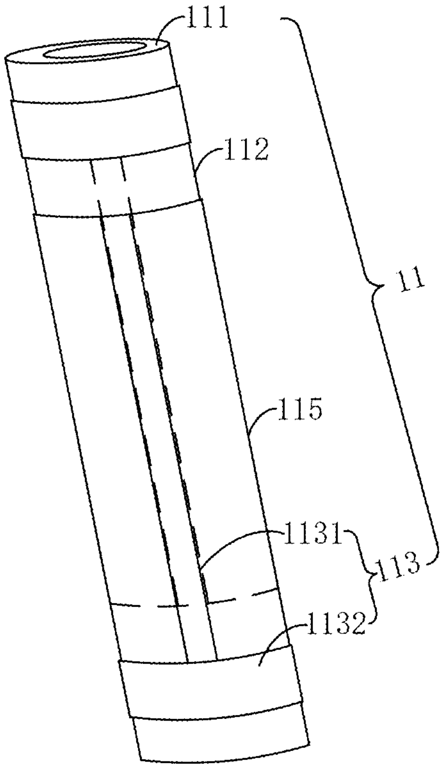
FIG. 2 is a diagram of a multi-layer structure of the heating body according to the present disclosure.

As shown in FIG. 1 to FIG. 2, provided is a structural diagram of a heating body 11 according to one embodiment of the present disclosure, that is, an infrared radiation coating 115 is applied on the periphery of an existing infrared heating body to form a multi-layer heating body. The heating body includes a base body 111, the base body is of a hollow tubular structure; preferably, the base body 111 generally may select circular tubular quartz glass, the wall thickness of the quartz glass generally selects to be as small as possible, and the present embodiments selects the quartz glass with a wall thickness of 1 mm as the base body 111. An infrared electrothermal coating 112 is formed on an outer surface of the base body 111, as shown in FIG. 2, the infrared electrothermal coating 112 is connected to a power supply through an electrode coating 113 electrically connected to the infrared electrothermal coating 112, generally the electrode coating 113 is applied at two ends of the base body 111, the electrode coating 113 further includes an electrode portion 1131 that extends from the electrode coating 113 along a longitudinal direction of the surface of the base body 111 and an electrode connection portion 1132 connected to the electrode portion 1131, the electrode portion 1131 is in the shape of a strip, the electrode connection portion 1132 together with the electrode portion 1131 extended therefrom forms one of a pair of electrodes, it is understandable that the above electrode coating 113 or the above electrode coating 113 having a strip portion appears pairwise, and they are insulated from each other, the above electrode coating 113 feeds electric energy to the infrared electrothermal coating 112 from the power supply, and depending on different layouts of electrodes, the current may flow through the infrared electrothermal coating 112 along the axial direction of the base body 111, or flow through the infrared electrothermal coating 112 along the circumferential direction of the base body 111 (in the case of having a strip part). The infrared radiation coating 115 is further formed on the outer surface of the base body 111 on which the infrared electrothermal coating 112 and the electrode coating 113 have been formed, and the infrared radiation coating 115 at least partially covers the infrared electrothermal coating 112. It is understandable that in order to minimize energy dissipation, preferably, the infrared radiation coating 115 covers the outer surface of the base body 111 other than the electrode coating 113 on the two ends.

The infrared electrothermal coating 112 is a resistor heating layer, which when electrified will generate resistance heat to get a temperature rise due to its resistance. The infrared electrothermal coating 112 generally selects materials of a high infrared emissivity, optionally, for example, materials containing tin oxide; as an option of such materials, antimony doped tin oxide is preferred. Tin oxide, as a conductive film, has charge carriers mainly come from crystal defects, that is, electrons provided by oxygen vacancies and doped impurities. $SnO_2$, after being doped with elements such as Sb, improves the conductivity property significantly and forms an n-type semiconductor. The semiconductor of Sb doped $SnO_2$ has good conductivity and stable performance, which is called ATO (Antimony Doped Tin Oxide). In addition, other $SnO_2$ dopant materials further include F, Ni, Mn, Mo, Ce, Cu, Zn, Ta, Si, N, P, In, Pd, Bi, etc.

The above antimony doped tin oxide may be prepared by a thermal spray method, for example, $SnCl_4 \cdot 5H_2O$, alcohol and aqueous solution are doped with an appropriate amount of $SbCl_3$ (generally the proportion is less than 10%), then the mixture is sprayed onto a high-temperature (greater than or equal to 400° C., preferably, the base body temperature is 500° C.) substrate surface using $N_2$ gas to form an $SnO_2$:Sb film. In order to improve the uniformity of the film, generally the base body material will be rotated at certain rate.

In addition, the above antimony doped tin oxide (ATO) infrared electrothermal coating 112 may also be prepared by a CVD method, a PVD method or a magnetron sputtering method.

As an example, described below is a process of preparing an antimony doped tin oxide (ATO) infrared electrothermal coating by magnetron sputtering.

An ATO film prepared by radio frequency magnetron sputtering

The magnetron sputtering coating technology is a novel physical vapor deposition (PVD) coating technology, which has the following advantages:

1. It can achieve large-area deposition, good process repeatability, and large-scale production.

2. The film has a compact structure and good adhesion to the base body.

3. It has a moderate deposition rate and a good process controllability.

4. It can accurately control the film thickness, with good film quality, uniform compositions and even distribution of thickness In the radio frequency magnetron sputtering process, a target material formed by high-temperature co-firing of $Sb_2O_3$ and $SnO_2$ powders is directly sputtered (where the atomic ratio of Sb/Sn in the target material may be 1:10, it is understandable that other ratios may also be selected, such as the range of 0.5:10-1.5:10), to obtain an Sb doped $SnO_2$ film.

The employed radio frequency magnetron sputtering system mainly includes the following parts: a vacuum system, a sputtering system, a gas transmission system and a heating system.

1. The vacuum system is composed of mechanical pumps (a mechanical roughing pump, a holding pump), molecular pumps and various valves (a preset valve, a rough valve, a high vacuum valve, etc.); it also includes rough vacuum and high vacuum measuring gauges (thermocouple gauge, ionization vacuum gauge); the ultimate pressure of the system can reach the order of $10^{-4}$ Pa.

2. The sputtering system employs a radio frequency power supply and a magnetron sputtering cathode target; the operating efficiency of the radio frequency power supply is 13.56 MHz, and the maximum power is 2 kW; the diameter of the target material is 70 mm, and the target material is installed on a water-cooled copper base.

3. The gas transmission system has 3 mass flowmeters and includes Ar, $O_2$, $N_2$, which is used for depositing metal nitrides or metal oxides. This process uses Ar as the working gas.

4. The heating system is provided with a heating tube at the center of the sample holder, the highest heating temperature of the base body may reach 550° C., the heating temperature of the base body may be measured through a thermocouple connected to the substrate support, and adjustment may be performed from the room temperature to the highest heating temperature through a control circuit.

Specific steps of the process are as follows.

1. Place a quartz tube sample with an outer diameter of 9.2 mm and a height of 30 mm on the substrate support, and vacuumize to below $5\times10^{-4}$ Pa.

2. Start the heating system, set the heating temperature of the base body to 300° C.

3. Input Ar gas, with a flow rate of 30-200 sccm, and maintain the pressure of the vacuum chamber at 0.1 Pa.

4. Start the revolution and rotation device of the workpiece rack, the revolution speed is 10 r/min and the rotation speed is 15 r/min.

5. Switch on the radio frequency power supply of the Sb doped $SnO_2$, set the power to 300 W, and start sputtering.

6. Set the sputtering time to 10-40 min, and the sputtering thickness to about 0.1-1.5 μm.

Through the above processes, an Sb doped $SnO_2$ film is prepared on the outer surface of the quartz tube, two ends of the quartz tube have a resistance value of 1.2 ohm, the quartz tube can generate heat when electrified, different dopant amounts of Sb could lead to a change of the resistance value, preferably the resistance value is ranged from 0.8 to 5.2 ohm. In addition, the $SnO_2$ film has a high infrared radiation efficiency.

As for the infrared radiation coating 115, the square resistance of the infrared radiation coating 115 is less than or equal to that of the infrared electrothermal coating 112, preferably, the square resistance of the infrared radiation coating 115 is less than that of the infrared electrothermal coating 112, the conversion from electric energy to thermal energy is mainly conducted in the infrared electrothermal coating 112, the infrared radiation coating 115 is more to perform conduction and absorb the energy radiated by the infrared electrothermal coating 112, and is less to perform the conversion from electric energy to thermal energy; in this way, more preferably, the infrared radiation coating 115 is an electrical insulation coating, which will not consume electric energy to generate heat at all, but just performs conduction and absorbs the energy radiated by the infrared electrothermal coating 112.

The thermal conductivity of the infrared radiation coating 115 is less than or equal to the thermal conductivity of the infrared electrothermal coating 112. Preferably, the thermal conductivity of the infrared radiation coating 115 is less than the thermal conductivity of the infrared electrothermal coating 112, to better prevent dissipation of energy due to heat conduction, to further improve the utilization of electric energy, to reduce the dissipation of heat of the heater, and to reduce the pressure of temperature control of the housing.

The infrared radiation coating 115 may get a temperature rise after absorbing heat and generate infrared rays of certain wavelength, for example, infrared rays of 1.5 μm to 15 μm.

The infrared radiation coating 115 may be made of materials with high infrared emissivity, such as oxide, carbon material, carbide, nitride, etc. Specifically, metal oxides and multicomponent alloy oxides include ferric oxide, aluminum oxide, chromium trioxide, indium trioxide, lanthanum trioxide, cobalt trioxide, nickel trioxide, antimony trioxide, antimony pentoxide, titanium dioxide, zirconium dioxide, manganese dioxide, cerium dioxide, copper oxide, zinc oxide, magnesium oxide, calcium oxide, molybdenum trioxide and so on; or, a combination of two or more of the above metal oxides; or, a ceramic material having such a cell structure as spinel, perovskite and olivine.

The carbon material has an emissivity close to blackbody properties, with a high infrared emissivity. The carbon material includes graphite, carbon fiber, carbon nanotube, graphene, diamond-like carbon film and so on.

The carbide includes silicon carbide, which has a high emissivity within a large infrared wavelength range (2.3 micrometers to 25 micrometers) and thus is a good near full-wave band infrared radiation material. In addition, the carbide further includes tungsten carbide, iron carbide, vanadium carbide, titanium carbide, zirconium carbide, manganese carbide, chromium carbide, niobium carbide and so on, all of which have a high infrared emissivity (MeC phase does not have strict chemical calculation composition and chemical formula).

The nitride includes metal nitrides and nonmetal nitrides, wherein the metal nitrides include titanium nitride, titanium carbonitride, aluminum nitride, magnesium nitride, tantalum nitride, vanadium nitride and so on; the nonmetal nitrides include boron nitride, phosphorus pentanitride, silicon nitride (Si3N4) and so on.

Other inorganic nonmetallic materials include silicon dioxide, silicate (including phosphosilicate, borosilicate, etc.), titanate, aluminate, phosphate, boride, sulfur compounds and so on.

The infrared radiation coating 115 may also employ the application of an infrared paint, for example, an infrared paint prepared by the above materials of high infrared emissivity or a combination thereof in combination with auxiliary materials such as a binder. An example of such a paint is as follows.

Ingredients of the infrared paint are as follows.

20-60 parts by weight of an adhesive;

0-10 parts by weight of carbon nanotubes, preferably 5-10 parts by weight;

30-45 parts by weight of a metal oxide;

0-10 parts by weight of a nano-scale rare earth oxide, preferably, 3-8 parts by weight;

1-4 parts by weight of glycerol; and 15-35 parts by weight of water.

The metal oxide mainly includes oxides of elements such as Mg, Al, Ti, Zr, Mn, Fe, Co, Ni, Cu, Cr. The particle size of the powder of these oxides generally is less than 1 μm.

The adhesive is one or more of silica sol, potassium water glass, sodium water glass and lithium water glass.

The nano-scale rare earth oxide can improve the overall activity of the constituent materials of the paint, optimize the overall strength, aging resistance and thermal stability of the paint.

The infrared paint of the above constituents is coated on the outer surface of the heating body 11, and then it is heated and cured to form the infrared radiation coating 115.

Figure 3:
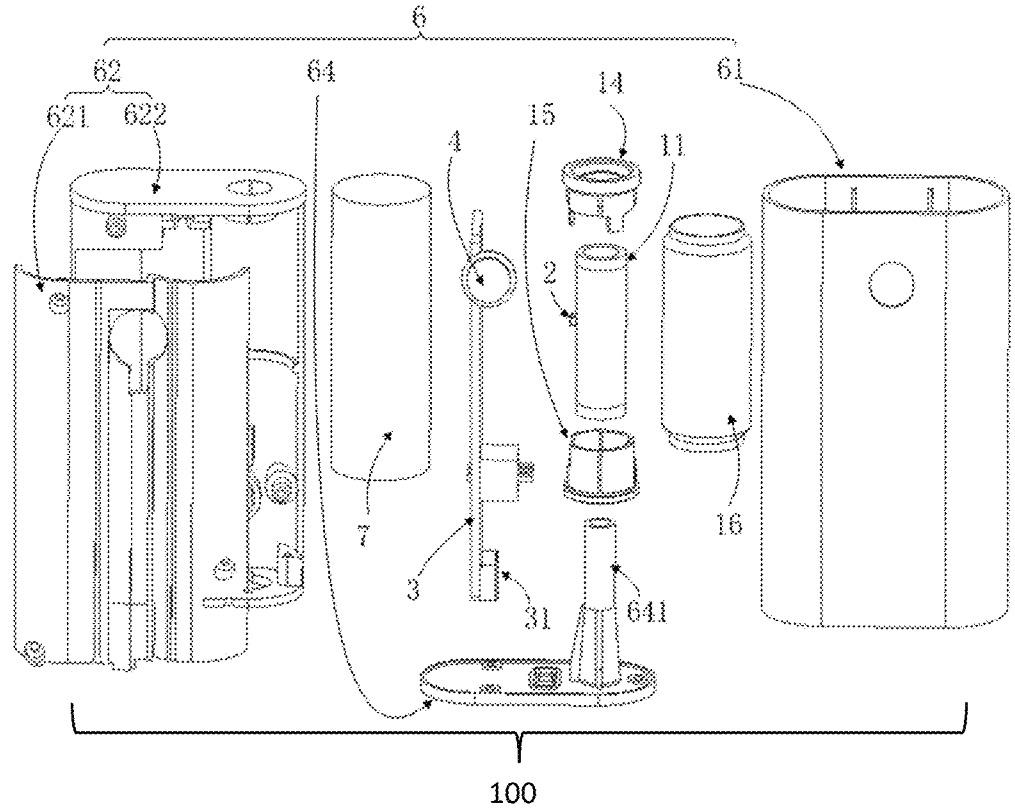
FIG. 3 is an exploded view of a heating device according to one embodiment of the present disclosure.

FIG. 3 shows a heating device 100 according to an embodiment of the present disclosure. The heating device 100 includes a shell assembly 6 and the above heating body 11, and the heating body 11 is arranged within the shell assembly 6. In the heating device 100 according to the present embodiment, an outer surface of the base body 111 is provided with an infrared electrothermal coating 112, and a first electrode (not shown) and a second electrode (not shown) electrically connected to the infrared electrothermal coating 112; a periphery of the infrared electrothermal coating 112 is further coated with an infrared radiation coating 115; the infrared electrothermal coating 112 may emit infrared rays to heat, in a manner of radiation, the aerosol generating substrate product in the chamber of the base body 111; the infrared radiation coating 115 is configured for preventing the loss of radiation of the infrared rays emitted by the infrared electrothermal coating 112 in the peripheral direction, thereby improving the heating efficiency of the heating body.

The shell assembly 6 includes an outer shell 61, a fixing shell 62, a fixing seat and a bottom cover 64. The fixing shell 62 and the fixing seat (14, 15) are both fixed within the outer shell 61, wherein the fixing seat (14, 15) is configured for fixing the base body 111, the fixing seat (14, 15) is arranged within the fixing shell 62, the bottom cover 64 is arranged on one end of the outer shell 61 and covers the outer shell 61. Specifically, the fixing seat (14, 15) includes an first fixing seat 14 and a second fixing seat 15, both of the first fixing seat 14 and the second fixing seat 15 are arranged within the fixing shell 62, a first end and a second end of the base body 111 are fixed on the first fixing seat 14 and the second fixing seat 15 respectively, the bottom cover 64 is provided with an air inlet tube 641 in a protruding manner, one end of the second fixing seat 15 away from the first fixing seat 14 is connected to the air inlet tube 641, wherein the first fixing seat 14, the base body 111, the second fixing seat 15 and the air inlet tube 641 are arranged coaxially, meanwhile, the base body 111 is sealed with the first fixing seat 14 and the second fixing seat 15, the second fixing seat 15 is also sealed with the air inlet tube 641, the air inlet tube 641 is communicated with external air to facilitate smooth inlet of air during the smoking process.

The heating device 100 further includes a master control circuit board 3 and a battery 7. The fixing shell 62 includes a front shell 621 and a rear shell 622, the front shell 621 is fixedly connected to the rear shell 622, both of the master control circuit board 3 and the battery 7 are arranged within the fixing shell 62, the battery 7 is electrically connected to the master control circuit board 3, a button 4 is protruded and arranged on the outer shell 61, and the infrared electrothermal coating 112 on the surface of the base body 111 may be powered on or powered off by pressing the button 4. The master control circuit board 3 is further connected to a charging interface 31, the charging interface 31 is exposed on the bottom cover 64, and a user may charge or upgrade the heating device 100 through the charging interface 31 to ensure the continued usage of the heating device 100.

The heating device 100 further includes a heat insulation element 16; the heat insulation element 16 include at least one of a vacuum tube, an aerogel tube, an aerogel felt or a polyurethane foam. In the present embodiment, the heat insulation element 16 is a hollow heat insulation tube, preferably, a vacuum heat insulation tube with the inner air pressure less than the ambient pressure, the heat insulation element 16 is arranged within the fixing shell 62, and the heat insulation element 16 is sleeved on outside of the base body 111, thereby being capable of preventing a large amount of heat being transferred to the outer shell 61 to cause a hot feeling for the user. The heat insulation element 16 may also be internally provided with an infrared reflection coating or embedded with a reflection element, so as to reflect the infrared rays emitted by the infrared electrothermal coating 112 formed on the base body 111 back to the infrared electrothermal layer 112, thereby increasing the heating efficiency.

The heating device 100 further includes an NTC temperature sensor 2, which is configured to detect the real-time temperature of the base body 111 and transmit the detected real-time temperature to the master control circuit board 3, then the master control circuit board 3 adjusts the amplitude of the electric power fed to the infrared electrothermal coating 112 according to the real-time temperature. Specifically, when the NTC temperature sensor 2 detects that the real-time temperature inside the base body 111 is relatively low, for example, when detecting that the temperature inside the base body 111 is lower than 150° C., the master control circuit board 3 controls the battery 7 to output a higher voltage to the electrode, thereby increasing the current fed to the infrared electrothermal coating 112, increasing the heating power of the aerosol generating substrate product and reducing the time the user needs to wait before taking the first puff. When the NTC temperature sensor 2 detects that the temperature of the base body 111 is 200° C. to 250° C., the master control circuit board 3 controls the battery 7 to output a low maintenance voltage to the electrode. When the NTC temperature sensor 2 detects that the temperature inside the base body 111 is or above 250° C., the master control circuit board 3 controls the battery 7 to stop outputting a voltage to the electrode.

It is to be noted that the description of the present disclosure and the drawings just list preferred embodiments of the present disclosure. The present disclosure may, however, be exemplified in many different forms and should not be construed as being limited to the specific embodiments set forth herein. These embodiments are not intended to form extra limits to the content of the present disclosure, rather, they are provided so that this disclosure will be thorough and complete. Moreover, the above technical features may continue to combine with each other to form various embodiments not listed above, and these embodiments are all intended to be covered by the description of the present disclosure. Further, for the ordinary staff in this field, improvements or variations may be made according to the above description, and these improvements or variations are intended to be included within the scope of protection of the claims appended hereinafter.

What is claimed is:

1. A heating device, configured for heating an aerosol generating substrate product and volatilizing at least one component therein to form an aerosol, comprising a heating body, wherein the heating body comprises:

a base body, which is provided with a chamber for receiving at least part of the aerosol generating substrate product;

an infrared electrothermal coating, which is formed on an outer surface of the base body and is configured for receiving a power supply to generate heat and transferring the heat to the aerosol generating substrate product received in the chamber at least in an infrared radiation manner, so as to volatilize at least one component in the aerosol generating substrate product to form an aerosol which can be inhaled;

an electrode coating, which is coated on part of the outer surface of the infrared electrothermal coating and configured for supplying an electric power of the power supply to the infrared electrothermal coating; and an infrared radiation coating, which at least partially covers the infrared electrothermal coating, the infrared radiation coating being capable of absorbing energy radiated by the infrared electrothermal coating and radiating infrared rays after a temperature rise.

2. The heating device according to claim 1, wherein the infrared radiation coating has a smaller square resistance than the infrared electrothermal coating.

3. The heating device according to claim 2, wherein the infrared radiation coating has a smaller thermal conductivity than the infrared electrothermal coating.

4. The heating device according to claim 1, wherein the infrared radiation coating has a smaller thermal conductivity than the infrared electrothermal coating.

5. The heating device according to claim 4, wherein the electrode coating comprises an electrode portion and an electrode connection portion, and the infrared radiation coating does not cover the electrode connection portion.

6. The heating device according to claim 1, wherein an outer surface of the base body forms a rough surface by machining, or the outer surface of the base body forms the rough surface by chemical etching, or the outer surface of the base body forms the rough surface by laser cauterization.

7. The heating device according to claim 1, further comprising a heating insulation element, wherein the heat insulation element is disposed at the circumferential periphery of the heating body to prevent dissipation of at least partial heat towards the periphery of the heating body.

8. The heating device according to claim 1, wherein the infrared radiation coating is made of oxide, carbon material, carbide, or nitride.

9. The heating device according to claim 1, wherein the infrared radiation coating is made of metal oxides and multicomponent alloy oxides including ferric oxide, aluminum oxide, chromium trioxide, indium trioxide, lanthanum trioxide, cobalt trioxide, nickel trioxide, antimony trioxide, antimony pentoxide, titanium dioxide, zirconium dioxide, manganese dioxide, cerium dioxide, copper oxide, zinc oxide, magnesium oxide, calcium oxide, molybdenum trioxide; or, a combination of two or more of the above metal oxides; or, a ceramic material having such a cell structure as spinel, perovskite and olivine.

10. The heating device according to claim 1, wherein the infrared electrothermal coating is made of materials containing tin oxide.

* * * * *